US007000725B2

(12) United States Patent
Sato et al.

(10) Patent No.: US 7,000,725 B2
(45) Date of Patent: Feb. 21, 2006

(54) AIRBAG DEVICE FOR PEDESTRIAN PROTECTION

(75) Inventors: Yuji Sato, Aichi-ken (JP); Kazutoshi Hayashi, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 50 days.

(21) Appl. No.: 10/662,283

(22) Filed: Sep. 16, 2003

(65) Prior Publication Data

US 2004/0074690 A1    Apr. 22, 2004

(30) Foreign Application Priority Data

Oct. 18, 2002  (JP)  ............................. 2002-304416

(51) Int. Cl.
*B60K 28/10* (2006.01)

(52) U.S. Cl. ..................................................... 180/274

(58) Field of Classification Search ................ 180/274, 180/271; 280/730.1, 748
See application file for complete search history.

(56) References Cited

FOREIGN PATENT DOCUMENTS

| DE | 19935342 | 2/2001 |
|----|----------|--------|
| DE | 10059224 | 7/2002 |
| DE | 10143448 | 5/2003 |
| DE | 10233593 | 2/2004 |
| JP | A-6-239198 | 8/1994 |
| WO | WO 3053751 A1 * | 7/2003 |

* cited by examiner

*Primary Examiner*—Faye M. Fleming
(74) *Attorney, Agent, or Firm*—Posz Law Group, PLC (57) ABSTRACT

The airbag device for pedestrian protection includes an airbag to be inflated in front of the vehicle and then be disposed between a pedestrian and the vehicle. The airbag includes a front cover portion and two fall preventing portions. The front cover portion covers the front side of the vehicle. The fall preventing portions cover the vicinities of the left and right edges of the top surface of the hood panel, respectively, and are projected upward so as to prevent the pedestrian from falling down. The airbag device for pedestrian protection is able to prevent the pedestrian mounted on a hood panel from falling down on road surface.

8 Claims, 10 Drawing Sheets

AIRBAG DEVICE FOR PEDESTRIAN PROTECTION

The present application claims priority from Japanese Patent Application No. 2002-304416 of Sato et al., filed on Oct. 18, 2002, the entirety of which is hereby incorporated into the present application by this reference.

BACKGROUND OF THE INVENTION

1. Field of the Invention

The present invention relates to an airbag device for pedestrian protection which utilizes an airbag to cover predetermined portions of a vehicle upon deployment.

2. Description of Related Art

In the prior art, Japanese Patent Laid-Open No. Hei 6-239198 discloses an airbag device for pedestrian protection which prevents collision of a pedestrian with a vehicle by inflating an airbag in front of the vehicle.

This airbag device for pedestrian protection protects a pedestrian by means of an airbag covering the front side of the vehicle from the vicinity of road surface.

However, when a pedestrian collides with a vehicle, there are some cases in which the pedestrian firstly mounts on top of the hood panel, and then falls down on road surface. The prior art has room for improvement in coping with those cases.

SUMMARY OF THE INVENTION

The present invention contemplates to solve the above-mentioned problem, and therefore, it is an object of the present invention to provide an airbag device for pedestrian protection capable of preventing a pedestrian mounted on the hood panel from falling down on road surface.

The airbag device for pedestrian protection according to the present invention is mountable on a motor vehicle with a hood panel, and includes an airbag inflatable in front of the vehicle. The inflated airbag is disposed between a pedestrian and the vehicle. The airbag includes a front cover portion for covering the front side of the vehicle, and two fall preventing portions for covering the vicinities of the left and right edges, respectively, of a top surface of the hood panel. The fall preventing portions are so projected upward as to prevent the pedestrian from falling down. The airbag may include one or more pieces of bags.

In the airbag device for pedestrian protection according to the present invention, when the pedestrian mounts on top of the hood panel of the vehicle, the pedestrian firstly engages the front cover portion of the airbag, and then mounts on top of the hood panel while slowing down the relative velocity to the vehicle. Subsequently, the pedestrian mounted on the hood panel is prone to fall down on road surface from the left or right edge of the hood panel. However, the pedestrian gets stuck by the fall preventing portions, and is restrained in an area between the fall preventing portions on top of the hood panel. Consequently, the pedestrian is prevented from falling down on road surface. This restraint by the fall preventing portions is performed smoothly since the relative velocity of the pedestrian to the vehicle has been slowed down by cushioning in the engagement of the pedestrian with the front cover portion.

Even in a case the pedestrian does not mount on the hood panel, the pedestrian is properly protected, without directly colliding with the front side of the vehicle, since the front side of the vehicle is covered by the front cover portion of the airbag.

Therefore, the airbag device for pedestrian protection according to the present invention is able to prevent a pedestrian mounted on the hood panel from falling down on road surface.

The airbag desirably includes a cushion portion for covering the hood panel which is located between the left and right fall preventing portions and has lower height than the left and right fall preventing portions. With this construction, the restraint of a pedestrian between the fall preventing portions is performed by the cushion portion, not the hood panel itself. Accordingly, the pedestrian is protected by the cushioning property of the cushion portion.

It is sufficient for the cushion portion to have cushioning property enough to restrain a pedestrian. Accordingly, the cushion portion does not necessarily have to be inflatable with inflation gas, but maybe formed of an uninflatable sheet-shaped member. In this case, the sheet-shaped member is arranged to float over the hood panel so as to secure the cushioning property.

Moreover, if the airbag is configured as a single piece including the front cover portion and the left and right fall preventing portions, the front cover portion and the left and right fall preventing portions are not easily separated. Consequently, even if a pedestrian engage toward the boundary of the front cover portion and the left and right fall preventing portions, the airbag is able to protect the pedestrian by preventing the pedestrian from directly bumping against the vehicle.

Of course, the airbag may include more than one bags. If it includes three bags, for example, two bags out of the three are arranged so that the rear parts thereof may function as the left and right fall preventing portions and the front parts may function as left and right parts of the front cover portion. The remaining one bag constitutes a central portion of the front cover portion.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

In this specification, front-rear direction is based on the front-rear direction of the vehicle, and left-right direction is based on the left-right direction of the vehicle as viewed from the rear side.

Figure 1:
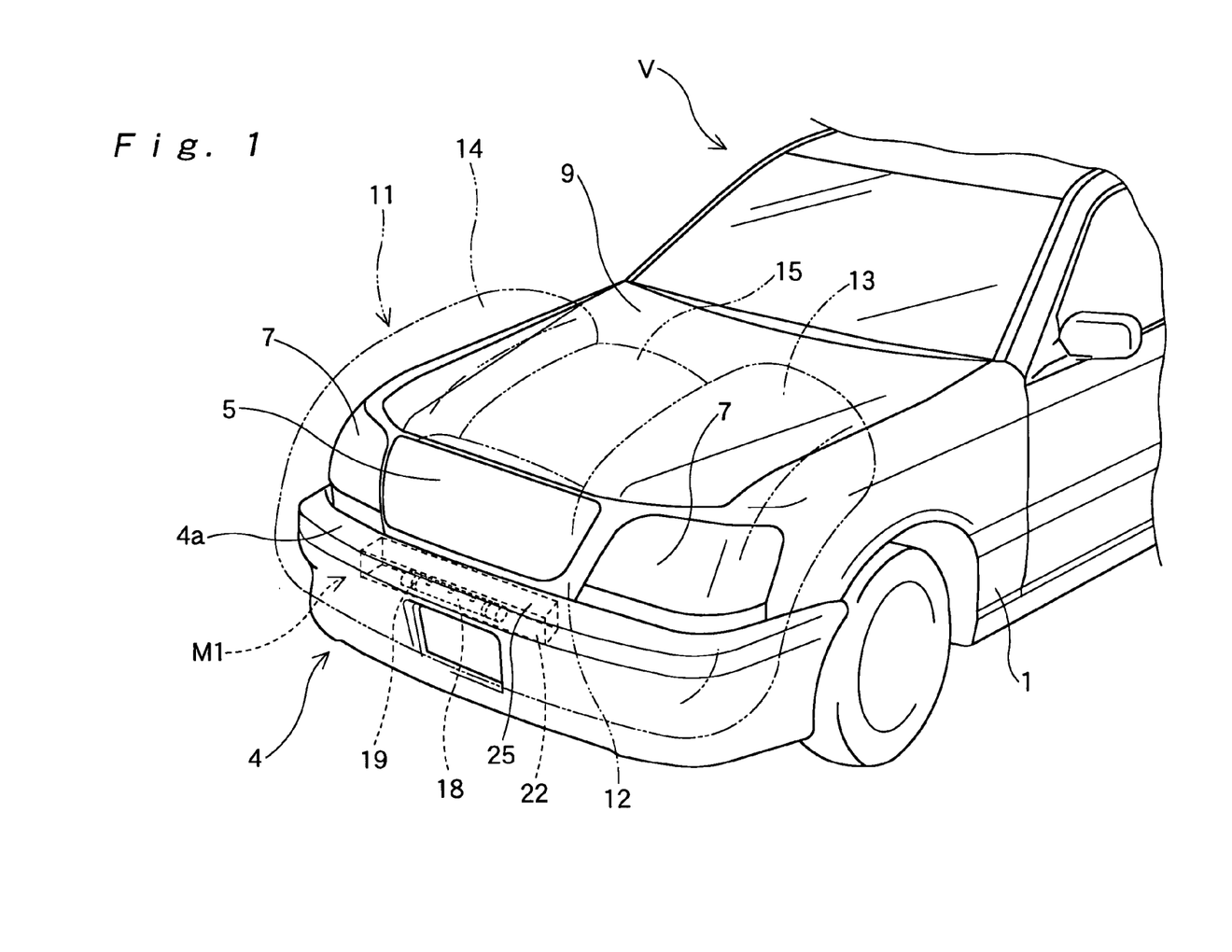
FIG. 1 is a schematic partial perspective view of a vehicle equipped with an embodiment of the airbag device for pedestrian protection according to the present invention.

FIGS. 1 to 5 illustrate a first airbag device M1 for pedestrian protection according to the present invention. Referring to FIG. 1, the airbag device M1 includes an airbag 11 housed in a front bumper 4 in the front side of a vehicle V, an inflator 18 for supplying inflation gas to the airbag 11, a case 22 for housing the airbag 11 and the inflator 18, and a cover member 25 for covering the housed airbag 11. The airbag device M1 further includes a sensor and a control device, although they are not shown in the drawings. The sensor is located in the front bumper 4, for example, for detecting a pedestrian. The control device predicts a collision of the vehicle V with a pedestrian in response to a signal from the sensor, and actuates the inflator 18.

Figure 2:
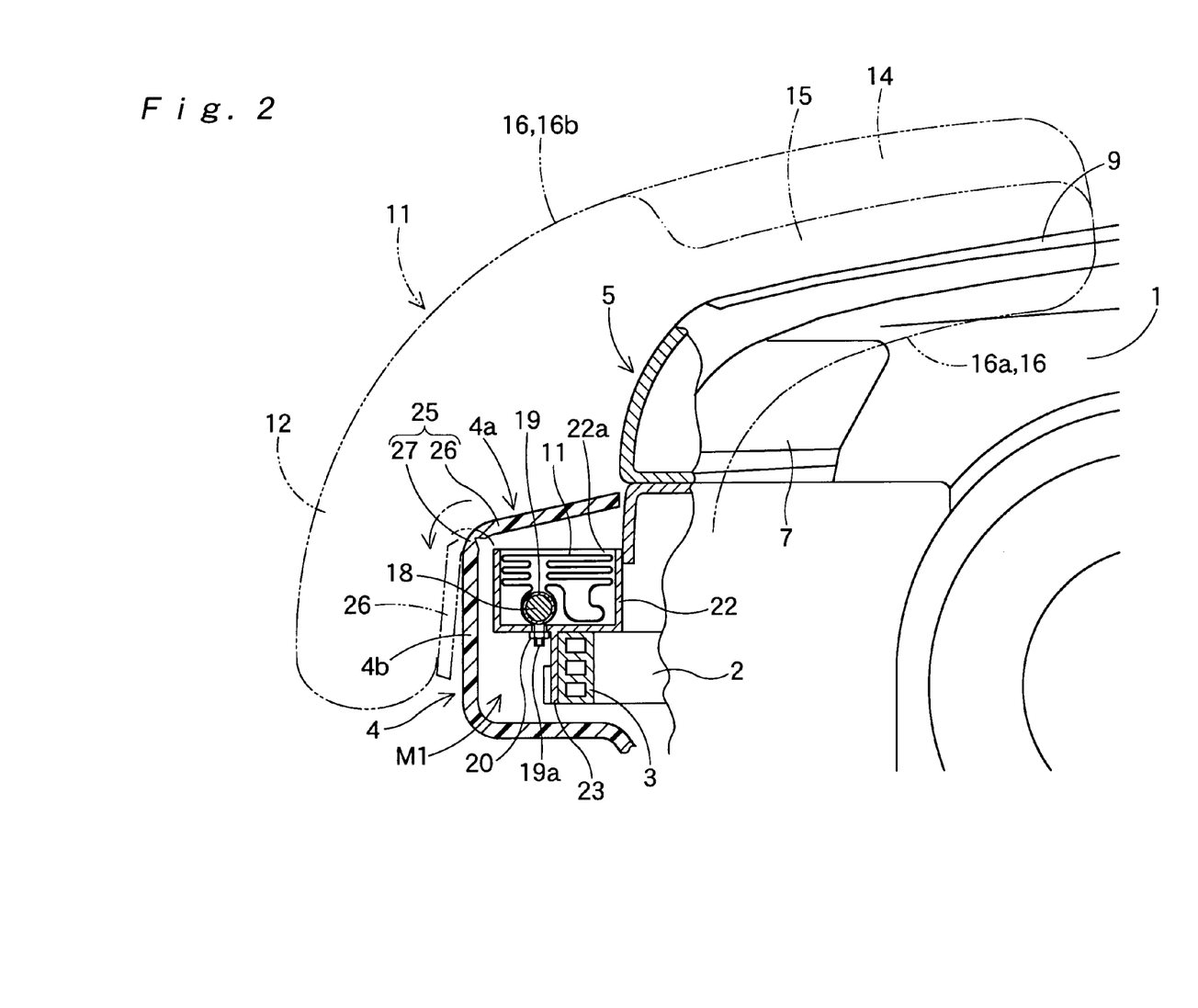
FIG. 2 is a schematic partial vertical section of the vehicle equipped with the airbag device for pedestrian protection of FIG. 1.

Referring to FIG. 2, the cover member 25 is constituted by an upper wall 4a of the front bumper 4, and includes a door 26 to be pushed open by the airbag 11 inflated. The door 26 is located in the upper wall 4a at the lower side of head lamps 7 of the vehicle V, and includes a thin hinge line 27 toward the boundary of the upper wall 4a and the front wall 4b of the bumper 4. When opening, the door 26 is configured to break the adjoining portion with the bumper upper wall 4a in its left and right edges, and open forward of the vehicle V around the hinge line 27.

Figure 3:
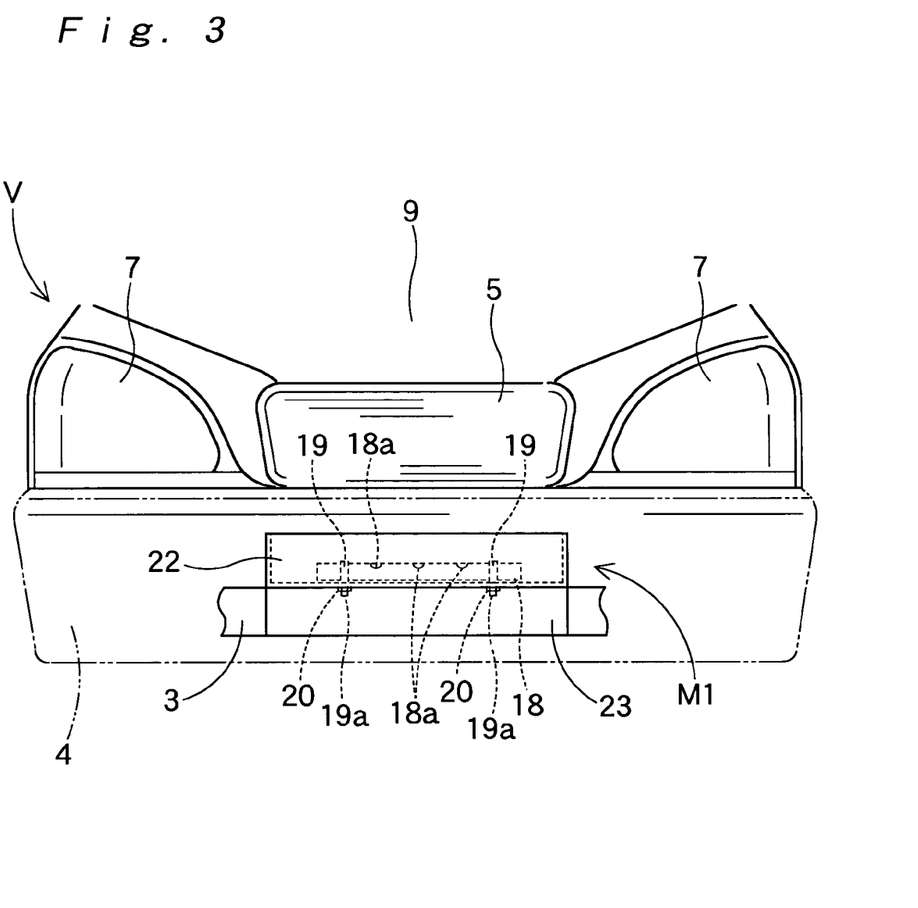
FIG. 3 is a schematic front view of the airbag device for pedestrian protection of FIG. 1 mounted on the vehicle.

The case 22 is made of metal such as a sheet metal, into an approximately rectangular parallelpiped box shape opened upward and having an approximately inverted-U shaped section. The case 22 includes a flange 23 extending downward. The flange 23 is secured to the front side of the bumper reinforcement 3 on the side of the body 1 by means of bolts and nuts, and thus the case 22 is mounted on the vehicle V along the reinforcement 3. The case 22, as mounted on the vehicle V, is covered toward the upper opening 22a by the door 26 of the cover member 25 in the front bumper upper wall 4a. As shown in FIGS. 1 and 3, the case 22 has a transverse length slightly shorter than the distance between the left and right head lamps 7, and is located toward the transverse center of the vehicle V. A member 2 shown in FIG. 2 is a side member with the reinforcement 3 joined to its front end.

The inflator 18 is controlled by the not-shown control device as described above. The inflator 18 has a cylindrical shape with a plurality of gas discharge ports 18a, and is held by a plurality of annular mounting brackets 19 with bolts 19a projected therefrom. The inflator 18, as housed in the airbag 11, is secured to the case 22 together with the airbag 11, by nut 20 fastening of the bolts 19a of the brackets 19 inserted through the airbag 11 and the case 22.

As shown in FIGS. 1 to 5, the airbag 11 is folded and housed in the case 22 while housing the inflator 18 inside. The airbag 11 includes a front cover portion 12 and two fall preventing portions 13 and 14 protruding upward. In the completely inflated condition, the front cover portion 12 covers the front side of the vehicle V, and the fall preventing portions 13 and 14 cover the vicinities of the left and right edges of the top surface of the hood panel 9, respectively, and prevent a pedestrian from falling down. In the foregoing embodiment, the front cover portion 12 covers the front side of the front grill 5 and the head lamps 7 up to the top surface of the front part of the hood panel 9, and further the front side of the front bumper 4 for housing the airbag 11.

Figure 4:
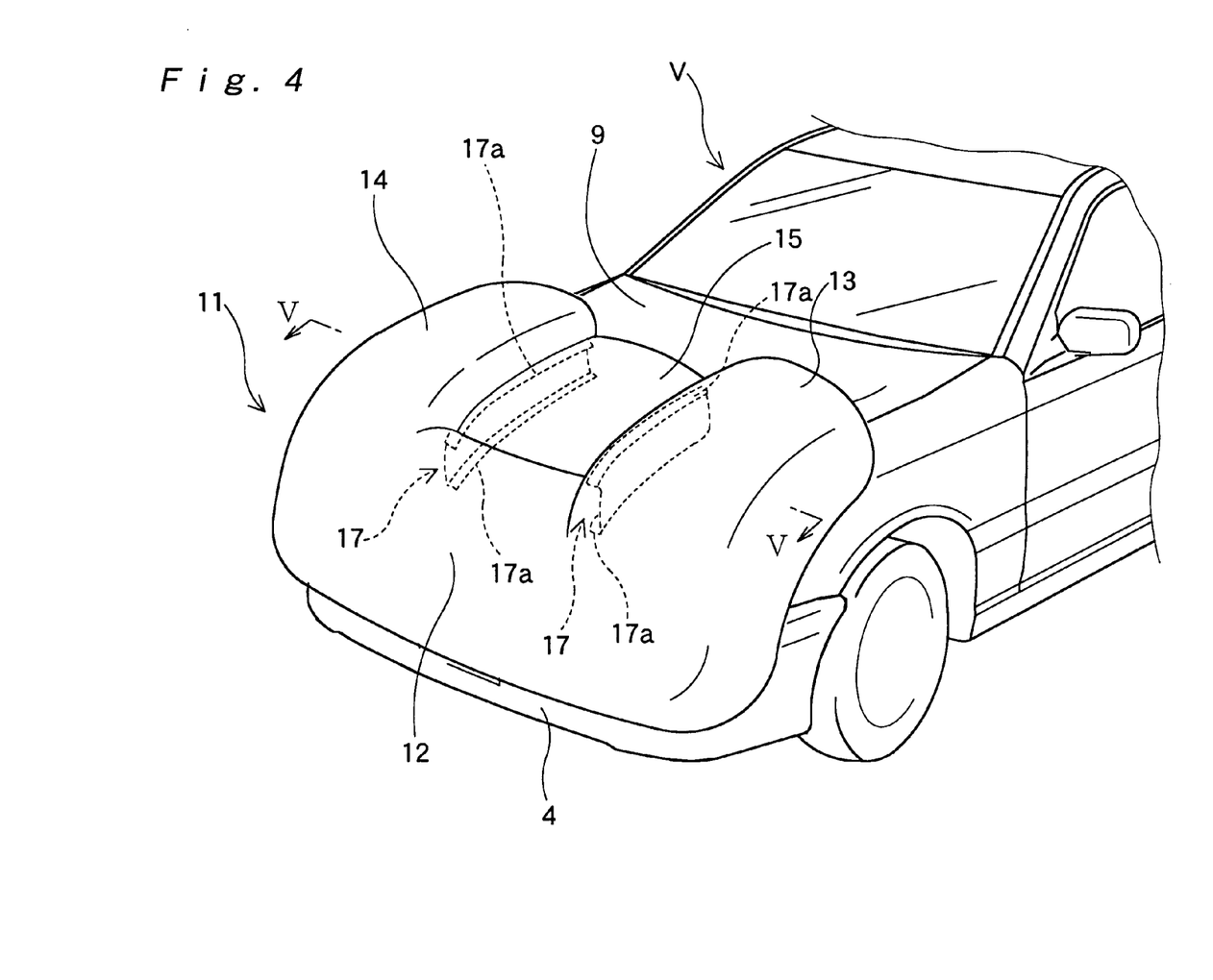
FIG. 4 is a schematic partial perspective view of the vehicle of FIG. 1 upon airbag deployment.

Referring to FIG. 4, the left and right fall preventing portions 13 and 14 are formed in a cylindrical shape extending rearward of the vehicle V from the vicinities of the left and right edges of the upper end of the front cover portion 12. Between the fall preventing portions 13 and 14, there is disposed a cushion portion 15 which inflates with inflow of inflation gas from the inflator 18.

Figure 5:
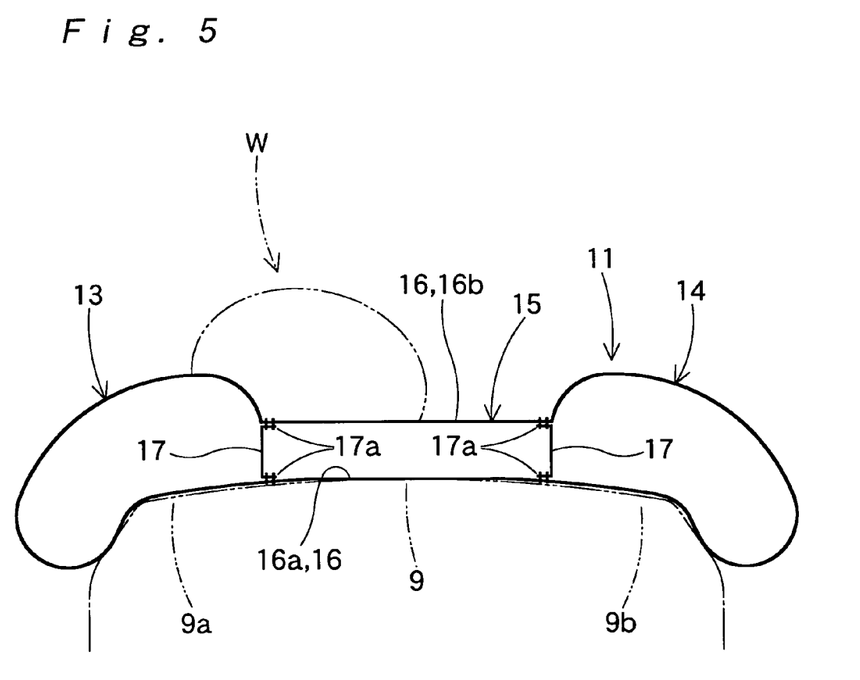
FIG. 5 is a schematic section of the airbag used in the airbag device for pedestrian protection of FIG. 1 in deployed condition, taken along line V—V of FIG. 4.

As shown in FIG. 5, the airbag 11 includes a base cloth 16 and two tethers 17 disposed internally, both of which are made of flexible material. The base cloth 16 has an approximately rectangular bag shape. Each of the tethers 17 extends along front-rear direction at the left or right side of the cushion portion 15, or in the boundary with the fall preventing portion 13 or 14. Each of the tethers 17 has a band shape, and is joined at both edges 17a in width direction to a wall 16a of the base cloth 16 toward the vehicle V and to a wall 16b toward a pedestrian. These tethers 17 help locate the cushion portion 15 on a lower level than the fall preventing portions 13 and 14.

In the airbag device M1 for pedestrian protection as mounted on the vehicle V, when the inflator 18 is actuated by the not-shown control device to discharge inflation gas from the gas discharge ports 18a, the airbag 11 inflates to push and open the door 26 of the cover member 25, then the respective parts 12, 13, 14 and 15 completes inflation.

At this time, when a pedestrian mounts on top of the hood panel 9 of the vehicle V, the pedestrian firstly engages the front cover portion 12 of the airbag 11, and then mounts on top of the hood panel 9 while slowing down the relative velocity to the vehicle V. Subsequently, the pedestrian W mounted on the hood panel 9 is prone to fall down on road surface from the left edge 9a or the right edge 9b of the hood panel 9. As shown in FIG. 5, however, the pedestrian W gets stuck by the fall preventing portion 13 or 14, and is restrained in an area between the fall preventing portions 13 and 14 on top of the hood panel 9. Consequently, the pedestrian W is prevented from falling down on road surface. This restraint by the fall preventing portions 13 and 14 is performed smoothly since the relative velocity of the pedestrian W to the vehicle V is slowed down by cushioning in the engagement of the pedestrian W with the front cover portion 12.

Even in a case the pedestrian W does not mount on the hood panel 9, the pedestrian W is properly protected, without directly colliding with the front side of the vehicle V, since the front side of the vehicle V is covered by the front cover portion 12 of the airbag 11.

Therefore, the airbag device M1 for pedestrian protection according to the present invention is able to prevent a pedestrian W mounted on the hood panel 9 from falling down on road surface.

Moreover, the airbag 11 in the foregoing embodiment includes a cushion portion 15 for covering the hood panel 9 of the vehicle V which is located between the left and right fall preventing portions 13 and 14, and has lower height than the fall preventing portions 13 and 14. This cushion portion 15, instead of the hood panel 9 itself, restrains the pedestrian W between the fall preventing portions 13 and 14. Accordingly, the pedestrian W is protected by the cushioning property of the cushion portion 15.

Figure 6:
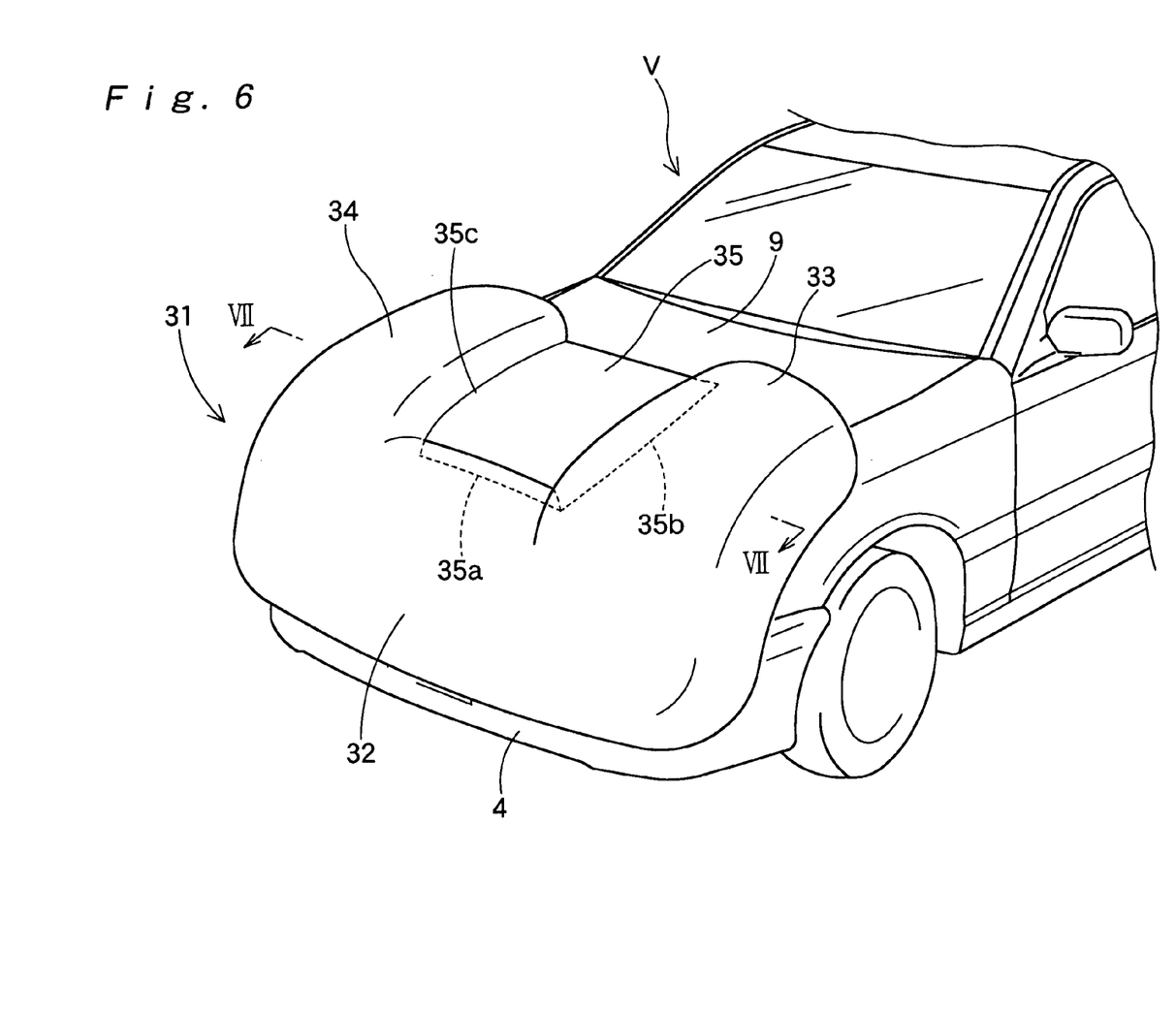
FIG. 6 is a schematic partial perspective view of a vehicle showing another embodiment of the airbag device of the present invention upon airbag deployment.
Figure 7:
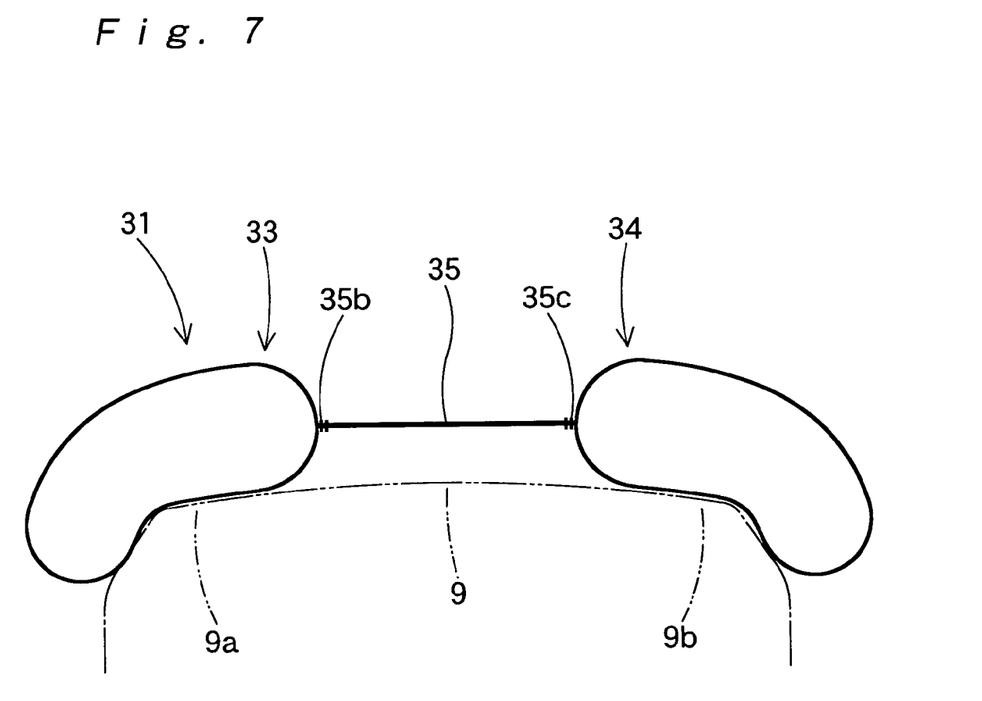
FIG. 7 is a schematic section of the airbag of FIG. 6, taken along line VII—VII of FIG. 6.

It is sufficient for the cushion portion 15 to have cushioning property enough to restrain a pedestrian. Accordingly, the cushion portion does not necessarily have to be inflatable with inflation gas, but may be configured like a cushion portion 35 in an airbag 31 shown in FIGS. 6 and 7. In this airbag 31, the cushion portion 35 is made of a sheet-shaped member which is not inflatable, and is joined at the front edge 35a with the front cover portion 32, and at the left and right edges 35b and 35c with the left and right fall preventing portions 33 and 34. The airbag 31 as completely inflated is so configured that the cushion portion 35 may float over the hood panel 9. When the front cover portion 32 and the fall preventing portions 33 and 34 of the airbag 31 complete inflation, a tension force is exerted to make the cushion portion 35 located above the hood panel 9. Accordingly, the pedestrian is restrained while being cushioned thereby.

Figure 8:
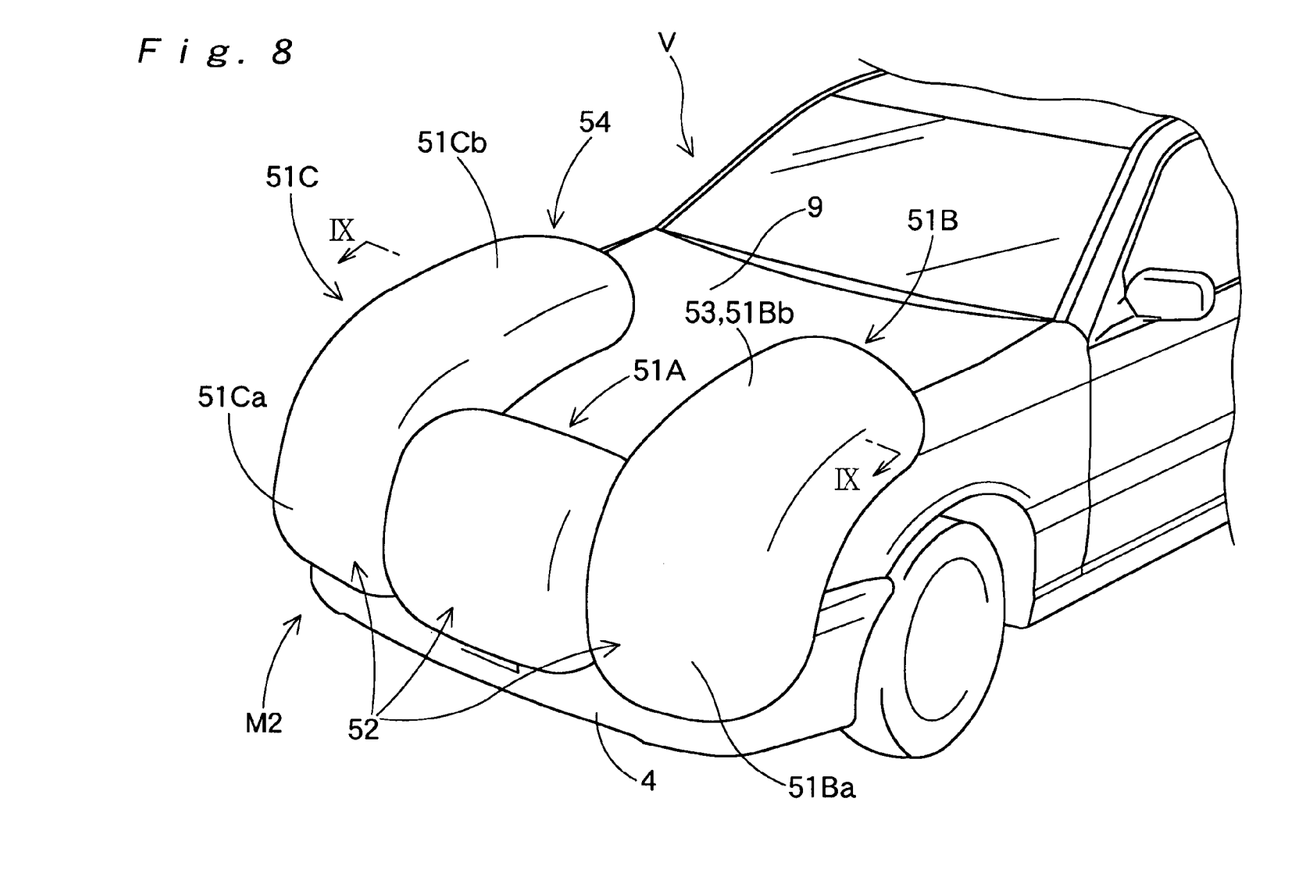
FIG. 8 is a schematic partial perspective view of a vehicle showing still another embodiment of the airbag device of the present invention upon airbag deployment.
Figure 9:
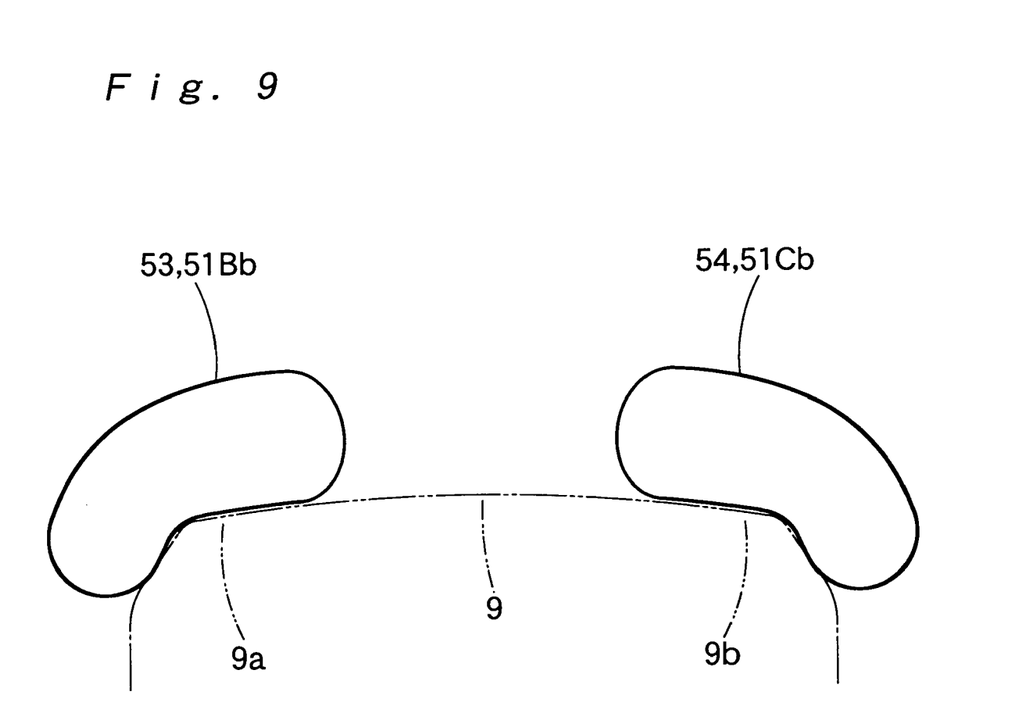
FIG. 9 is a schematic section of the airbag of FIG. 8, taken along line IX—IX of FIG. 8.

Instead of employing a single airbag as in the foregoing embodiment, the airbag device for pedestrian protection according to the present invention may employ two or three airbags 51A, 51B and 51C as in a second airbag device M2 for pedestrian protection shown in FIGS. 8 and 9. Alternatively, it may employ more than three airbags.

The airbag device M2 for pedestrian protection shown in FIGS. 8 and 9 includes an airbag 51A for covering the vicinity of the front side of a front grill, and airbags 51B and 51C for covering the vicinities of the front side of left and right head lamps 7 and the vicinities of the left and right edges 9a and 9b of the top surface of the hood panel 9. In this airbag device M2, the airbag 51A and the front sides 51Ba and 51Ca of the airbags 51B and 51C constitute a front cover portion 52 for covering the vehicle's front side. The rear side 51Bb of the airbag 51B constitutes a fall preventing portion 53 for covering toward the left edge 9a of the top surface of the hood panel 9, and the rear side 51Cb of the airbag 51C constitutes a fall preventing portion 54 for covering toward the right edge 9b of the top surface of the hood panel 9.

These airbags 51A, 51B and 51C are housed in a predetermined case in the front bumper 4 while connected to an inflator for supplying inflation gas. The airbags 51A, 51B and 51C may share one inflator, or alternatively, each of the airbags may be connected to an inflator, respectively.

However, in the airbag device M1, the airbags 11 and 31 are configured as a single piece including the front cover portions 12 and 32 and the left and right fall preventing portions 13, 14, 33 and 34, and therefore, the front cover portions 12 and 32 and the left and right fall preventing portions 13, 14, 33 and 34 are not easily separated. Consequently, even if a pedestrian engage toward the boundary of the front cover portions 12 and 32 and the left and right fall preventing portions 13, 14, 33 and 34, the airbags 11 and 31 are able to protect the pedestrian by preventing the pedestrian from directly bumping against the vehicle.

Figure 10:
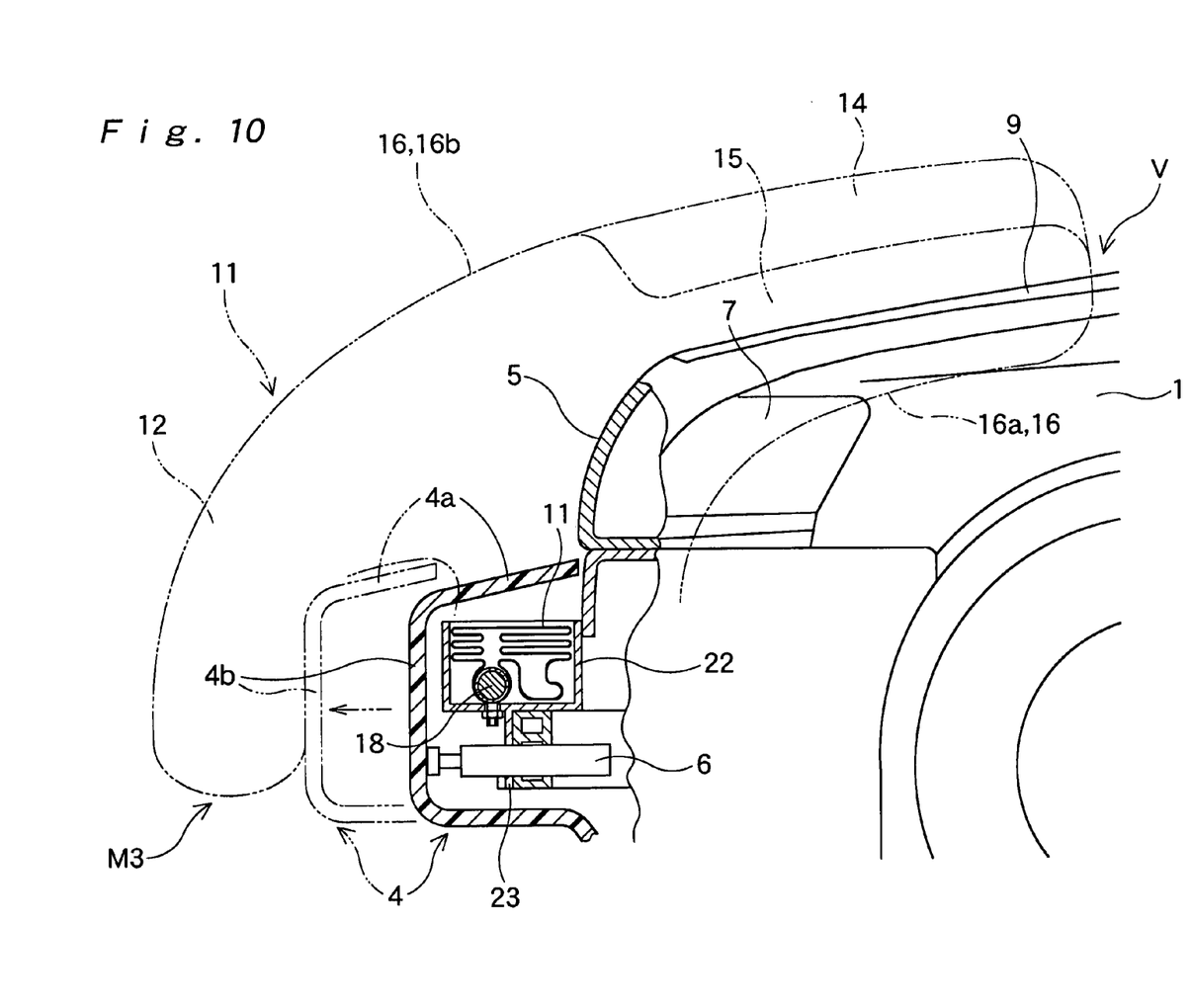
FIG. 10 is a vertical section of yet another embodiment of the airbag device of the present invention.

In the preferred embodiments, the upper wall 4a of the front bumper 4 as an airbag cover 25 for covering the folded airbag 11 includes a door 26, and the door 26 is configured to open upon inflation of the airbag 11. However, as in a third airbag device M3 for pedestrian protection shown in FIG. 10, the front bumper upper wall 4a itself as the airbag cover 25 may be moved together with the front bumper 4. In the airbag device M3, the bumper 4 shifts forward on predicting engagement with a pedestrian and before the engagement, by means of an actuator 6 such as a hydraulic cylinder, which is fixed to the bumper reinforcement 3 or the like, thereby opening the upper side of the folded airbag 11.

Moreover, with respect to the vehicle V to be equipped with an airbag device for pedestrian protection, it will be appreciated that the vehicle lifts the hood panel 9 upon predicting engagement with a pedestrian, and utilizes the present invention together with plastic deformation of the hood panel 9 itself and/or a shock-absorbing mechanism provided in the lifting mechanism, so as to protect the pedestrian.

What is claimed is:

1. An airbag device for pedestrian protection mountable on a motor vehicle with a hood panel, the airbag device comprising:
   an airbag inflatable in front of the vehicle and then to be disposed between a pedestrian and the vehicle,
   the airbag comprising one or more pieces of bags; and
   the airbag comprising a front cover portion for covering the front side of the vehicle, and two fall preventing portions for respectively covering the vicinities of the left and right edges of a top surface of the hood panel, the fall preventing portions being projected upward so as to prevent the pedestrian from falling down,
   the left and right fall preventing portions forming an area therebetween, the area being recessed with respect to the left and right fall preventing portions, whereby a pedestrian can be restrained in the area.

2. The airbag device for pedestrian protection according to claim 1, wherein the airbag further comprises a cushion portion for covering the hood panel, the cushion portion being located between the left and right fall preventing portions and having lower height than the left and right fall preventing portions.

3. The airbag device for pedestrian protection according to claim 2, wherein the cushion portion is inflatable with inflation gas.

4. The airbag device for pedestrian protection according to claim 2, wherein the cushion portion is formed of an uninflatable sheet-shaped member to be joined to the left and right fall preventing portions and the front cover portion, the sheet-shaped member floating over the hood panel.

5. The airbag device for pedestrian protection according to claim 1, wherein the airbag is configured as a single piece including the front cover portion and the left and right fall preventing portions.

6. The airbag device for pedestrian protection according to claim 1, wherein:
   the airbag comprises three pieces of bags;
   in two bags out of the three, the rear parts constitute the left and right fall preventing portions while the front parts constitute left and right parts of the front cover portion; and
   the remaining one bag constitutes a central portion of the front cover portion.

7. The airbag device for pedestrian protection according to claim 1, wherein the left and right fall preventing portions are formed in a cylindrical shape.

8. The airbag device for pedestrian protection according to claim 1, wherein the front cover portion covers a front side of a front grill and headlamps.

* * * * *